United States Patent
Lynch

(12) 
(10) Patent No.: US 6,433,105 B1
(45) Date of Patent: Aug. 13, 2002

(54) PROCESS FOR DESOLVENTIZING LOW MOLECULAR WEIGHT DIENE POLYMERS

(75) Inventor: Thomas J. Lynch, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/591,465

(22) Filed: Jun. 9, 2000

(51) Int. Cl.$^7$ ................................................. L08F 8/42
(52) U.S. Cl. ................. 525/370; 525/332.8; 525/332.9; 525/333.1; 525/333.2; 525/342; 525/371
(58) Field of Search ................................. 525/342, 370, 525/371; 528/501, 509

(56) References Cited

U.S. PATENT DOCUMENTS

| | | |
|---|---|---|
| 4,619,982 A | 10/1986 | Jenkins |
| 4,931,376 A | 6/1990 | Ikematsu et al. |
| 5,134,199 A | 7/1992 | Hattori et al. |
| 5,159,022 A | 10/1992 | Ikematsu et al. |
| 5,580,930 A | 12/1996 | Kang et al. |
| 5,753,579 A | 5/1998 | Jalics et al. |
| 6,018,007 A | 1/2000 | Lynch |

FOREIGN PATENT DOCUMENTS

| | | | |
|---|---|---|---|
| EP | 0 091 287 B1 | 3/1983 | |
| EP | 0 234 512 A2 | 2/1987 | |
| EP | 0 493 839 | 7/1992 | ............. C08F/4/48 |
| FR | 2 375 283 | 7/1978 | ........... C08L/23/22 |
| FR | 2 567 135 A1 | 6/1985 | |
| GB | 2 161 169 B | 7/1985 | |

OTHER PUBLICATIONS

"Additives in Rubber Processing," by Lloyd, D.G., *Progress in Rubber and Plastics Technology*, vol. 4, No. 4, pp. 21–38 (1988).

"Evaluation of a New Low Molecular Weight BR as an NR Curing Plasticizer," Lithium Corp. of America, Inc., *Rubber World*, vol. 163, No. 4, pp. 48–50 (1971).

"Liquid BR's: A booming technology," Lithium Corp. of America, Inc., subsidiary of Gulf Resources & Chemical Corp., vol. 163, No. 4, pp. 47–48 (1971).

"How liquid resins improve compound processing," by Drake, R. E. and Labriola, J., *Rubber and Plastics News*, Rubber & Plastics News, vol. 15, No. 1, pp. 14–17, (1985).

"How liquid resins improve compound processing," by Drake, R. E. and Labriola, J., *Rubber and Plastics News*, vol. 14, No. 27, pp. 14–17 (1985).

"A look at Kuraray Liquid Isoprene Rubber 30, 50," by Kuraray, *Rubber World*, vol. 179, No. 5, pp. 37–40 (1979).

"Vestenamer often helpful to offset poor processability, shrinkage," by Klaus M. Diedrich, ITEC Conference Proceedings, pp. 137–143 (1996).

Jenkins, D.K. *Polymer*, vol. 26, No. 1, pp. 147 (1985).

*Primary Examiner*—Bernard Lipman
(74) *Attorney, Agent, or Firm*—Meredith Palmer; Ann Skerry

(57) ABSTRACT

A butadiene-type polymer suitable for use as a processing aid in a rubber composition is formed by polymerizing butadiene or other conjugated diene monomers in a solvent, such as hexane, to form a polymer of relatively low molecular weight (around 30–40,000 g/mole). The polymer is coupled with a coupling agent, such as tin tetrachloride, to increase its molecular weight to a level at which conventional desolventizing processes may be used to remove the solvent from the mix. After desolventizing, the polymer is decoupled, by heating, to return the polymer to its original molecular weight.

20 Claims, 1 Drawing Sheet

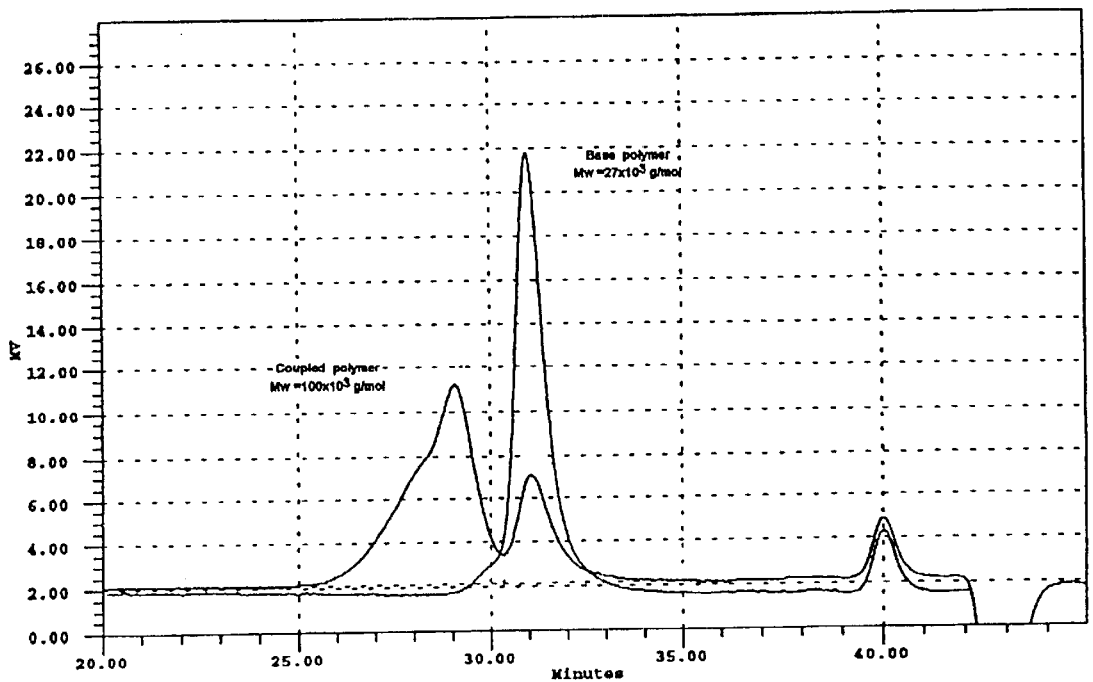
FIG.

PROCESS FOR DESOLVENTIZING LOW MOLECULAR WEIGHT DIENE POLYMERS

BACKGROUND OF THE INVENTION

The present invention is related to the chemical processing arts. It finds particular application in the preparation of trans-butadiene polymers which are excellent in moldability and processability for use as additives in rubber manufacturing. It is to be appreciated that the invention is also applicable to preparation of a variety of other low molecular weight polymers.

Low molecular weight polymers are useful processing aids in rubber compounds. Polymers with unsaturation in the backbone provide superior characteristics when blended with tire elastomers since the low molecular weight polymers are able to cocure with the elastomer. The processing aid thus becomes a load bearing component of the cured matrix. Other processing aids, such as processing oils, waxes, and low molecular weight saturated polymers act as diluents and do not contribute to the strength of the cured product.

Polyisoprene and polyoctanamer (Vesetenamer™) have been used as processing aids in rubber compounds. Both, however, tend to be expensive. Polyisoprene is a viscous resin, which is difficult to handle. More recently, low molecular weight trans-polybutadiene has been found to be useful as a reactive processing aid. It has advantages in that it is less expensive to produce than other processing aids with unsaturation and it is a solid at room temperature, allowing it to be handled in pelletized form.

Butadiene polymers having a high content of trans-1,4-linkage have been produced using polymerization catalysts. Such polymers can be produced using three known techniques, as follows:

1) a preparation technique using a Ziegler catalyst containing a transition metal as the main component;
2) a preparation technique using an anion polymerization catalyst system comprising an alkaline earth metal compound as the main component; and
3) a preparation technique using a catalyst comprising a rare earth metal compound as the main component.

In the first technique, transition metals, such as nickel, cobalt, titanium, and vanadium have been found to effect a high degree of stereo-regular polymerization of a conjugated diene monomer. For example, butadiene may be polymerized using a titanium metal in the form of a tetravalent titanium metal compound, and a carrier of magnesium halide. Polymerization of isoprene using a complex catalyst of tetravalent vanadium halide and an organic aluminum has also been reported.

In the second technique, an organometal compound of a group IIA a metal is used as the polymerization catalyst. Beryllium and magnesium organometal compounds may be synthesized with relative ease. However, polymerization activity for conjugated dienes is only exhibited under special reaction conditions. In contrast, group IIA metal salts of organic acids, for example barium and strontium, when combined with other organic metal compounds are known to be effective for polymerization of conjugated diene monomers. For example, catalyst systems employing barium-di-tert-butoxide and an organomagnesium compound have been used in the polymerization of butadiene. Organic compounds of barium or strontium, in combination with an organolithium and an organic metallic compound of group IIB or IIIA metal have also been used.

In the third technique, a salt or complex of a lanthanide metal is used in combination with an organo-magnesium compound or an organotithium compound. The organomagnesium compound is a dihydrocarbyl magnesium compound, such as a dialkyl magnesium, dicycloalkylmagnesium, or diarylmagnesium compound. The rare earth element may be any of those from atomic number 57(lanthanum) to 71 (lutetium), although some are less effective than others. Organic acid salts of neodymium (e.g., Versatic acid, a synthetic acid composed of a mixture of highly branched isomers of $C_{10}$ monocarboxylic acids, sold by Shell Chemicals) and an organomagnesium compound have been used to produce crystalline butadiene having high trans-linkage. Other Versatic acid salts, such as those of Di, Pr, and the like may also be used. A tri-block or radial arm block copolymer can be prepared from a styrene or styrene butadiene block and a high trans-poly-butadiene block (greater than 80% trans). The styrene or styrene/butadiene block is first prepared using a butyllithium/dibutylmagnesium catalyst system. When the polymerization is complete, a lanthanum organic acid salt is added, followed by more butadiene. Formation of crystalline trans-butadiene polymers in a hydrocarbon solvent using a complex catalyst of organic acid salts of lanthanum or cerium and an organomagnesium compound also is known.

Low molecular weight processing aids of the types described are viscous resins at the temperatures at which they are desolventized. Because the molecular weight of the compounds formed is generally less than 100,000, and often around 40,000, desolventizing by conventional methods, such as steam desolventizing or drum drying, is not possible. Desolventizing is the removal of solvents used to facilitate the formation of the processing aids. Equipment capable of desolventizing viscous liquids is not generally found in synthetic elastomer plants, which generally handle much higher weight elastomers.

There remains a need for a new and improved method of preparing low molecular weight butadiene polymers for use as a processing aid in rubber compounds and the like, which allows the use of conventional desolventizing processes.

SUMMARY OF THE INVENTION

Briefly, the present invention provides a method for preparing a butadiene-type polymer. A butadiene monomer, optionally with another conjugated monomer, is polymerized in a suitable solvent in the presence of a catalyst to form a polymer of a first molecular weight. The polymer is reacted with a coupling agent to form a coupled polymer of a second molecular weight which is higher than the first molecular weight. The coupled polymer is treated to remove the solvent. The desolventized coupled polymer is decoupled to provide a decoupled polymer having a lower molecular weight than that of the coupled polymer.

One advantage of the present invention is that polybutadiene polymers may be formed at low molecular weight.

Another advantage of the present invention is that conventional desolventizing procedures may be used for extracting the polymer.

Still further advantages of the present invention will become apparent to those of ordinary skill in the art upon reading and understanding the following detailed description of the preferred embodiments.

BRIEF DESCRIPTION OF THE DRAWINGS

The FIGURE is a size exclusion chromatograph for a butadiene polymer before and after coupling with tin tetra chloride.

DETAILED DESCRIPTION OF THE PREFERRED EMBODIMENTS

Low molecular weight polymers of butadiene and other conjugated dienes are prepared by a polymerization process in the presence of a catalyst, such as a rare earth/dialkyl magnesium or rare earth/alkyllithium catalyst, which results in a quasi-living polymer. That is, a significant fraction of the polymer molecules retain a reactive end group following the polymerization of the monomer. The reactive end groups of the polymer formed is reacted with a coupling agent, such as tin tetrachloride ($SnCl_4$), to increase temporarily the molecular weight of the polymer so that it can be desolventized by conventional methods. The desolventized polymer is then decoupled to provide a low molecular weight polymer suitable as a processing aid in, for example, the formation of rubber compounds and the like.

In the processes, a monomer or monomers are catalytically converted to a polymer having a weight average molecular weight ($M_w$) of about 40,000 and preferably a high trans content (greater than 80% trans). Although in some instances it may be possible to use a cis polymer, forming cis polymers of relatively low molecular weight may prove difficult. Examples of conjugated diene monomers which may be polymerized include butadiene and isoprene, although the process is not restricted to the use of one or other of these two conjugated dienes. Mixtures of conjugated dienes may be used as the starting monomers, if desired.

The polymerization process yields a living polymer (i.e., one having a reactive end group). The reactive end group is typically a negatively charged end group which ionically bonds to or associates with a positively charged species such as a metal cation. A variety of polymerization catalysts are capable of forming a living polymer, including, but not limited to, organic salts or complexes of rare earth (lanthanum series) metals, organic compounds of lithium, organomagnesium compounds, organoaluminum compounds, organozinc compounds, and organic compounds of barium or strontium. These catalysts are preferably used in combination. Exemplary catalyst systems include:

I.
   (a) a salt or a complex of a lanthanum metal; and
   (b) an organomagnesium compound or organolithium compound.

II.
   (a) a salt or a complex of a lanthanum metal;
   (b) an organomagnesium compound; and
   (c) an organic compound of lithium.

III.
   (b) an organomagnesium compound;
   (c) an organic compound of lithium; and
   (d) an organic compound of barium or strontium.

IV.
   (b) an organomagnesium compound;
   (c) an organic compound of lithium;
   (d) an organic compound of barium or stronium;
   (e) an organoaluminum or organozinc compound.

The lanthanide series metal in component (a) may be any rare earth element of those having an atomic number of 57 (lanthanum) to 71 (lutetium). However, the polymerization activity of certain of these elements, e.g., samarium, in previously described catalysts is low. Therefore, a compound of lanthanum, cerium, praseodymium, neodymium, gadolinium, terbium, or dysprosium is preferred. A mixture of two or more rare earth elements may be used. A compound of lanthanum, neodymium or "didymium" (which is a mixture of rare earth elements containing approximately 72% neodymium, 20% lanthanum, and 8% praseodymium) is particularly preferred.

Examples of compounds suitable as component (a) are "didymium" versatate (derived from Versatic™ acid, a synthetic acid composed of a mixture of highly branched isomers of $C_{10}$ monocarboxylic acids, sold by Shell Chemicals), neodymium versatate, and praseodymium (2, 2, 6, 6-tetramethyl-3,5-heptane dione). Rare earth versatates are generally preferred because they are readily soluble, easy to prepare, and stable.

Other lanthanides useful as component (a) include organic acid salts of lanthanum or cerium. The organic acid salt of lanthanum or cerium can be readily obtained, for example, by making an alkali metal salt of an organic acid to react with a chloride of lanthanum or cerium in water or an organic solvent, such as an alcohol, ketone, or the like. The organic acid salt of lanthanum or cerium may contain inorganic salts of lanthanum or cerium or organic acids as impurities in small amounts.

The organic acid compounds that may be employed with lanthanum are represented by formulae 1) to 8), as shown below. These compounds may also be used with cerium or neodymium.

1) 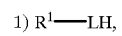

2) 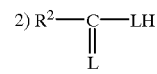

3) 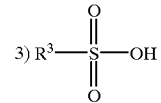

4) 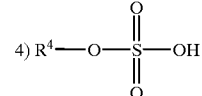

5) 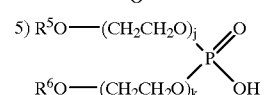

6) 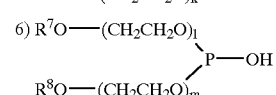

7) 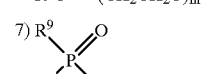

8) 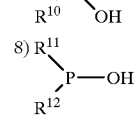

In the foregoing, each of $R^1$, $R^2$, and $R^5$–$R^8$ independently represents an aliphatic or cycloaliphatic hydrocarbon group or an unsubstituted or substituted aromatic hydrocarbon group; $R^3$ represents unsubstituted or substituted aromatic hydrocarbon group; $R^4$ an aliphatic or cycloaliphatic hydrocarbon group; $R^9$–$R^{12}$ independently represent an aliphatic or cycloaliphatic hydrocarbon group, an unsubstituted or substituted aromatic hydrocarbon group, an alkoxy group or a phenoxy group; L is O or S; and j, k, l, and m independently are integers from 1 to 6. These compounds may be used singly or in combination.

Suitable organic acid compounds of group 1) include alcohols, thioalcohols, phenols and thiols. Examples include methyl alcohol, ethyl alcohol, propyl alcohol, isopropyl alcohol, tert-butyl alcohol, and the like.

Suitable carboxylic acids or sulfur analogues of group 2) include isovaleric acid, caprylic acid, octanoic acid, lauric acid, myristic acid, palmitic acid, stearic acid, oleic acid, linoleic acid, cyclopentanecarboxylic acid, naphthenic acid, ethylhexanoic acid, pivalic acid, and the like.

Suitable alkyl aryl sulfonic acids of group 3) include dodecylbenzenesulfonic acid, tetradecyl benzenesulfonic acid, hexadecylbenzenesulfonic acid, octadecylbenzenesulfonic acid, dibutylnaphthalenesulfonic acid, n-hexylnaphthalenesulfonic acid, dibutylphenyl sulfonic acid and the like.

Suitable mono-alkyl esters of sulfuric acid of group 4) include sulfuric acid mono-ester of lauryl alcohol, sulfuric acid mono-ester of oleyl alcohol, sulfuric alcohol acid mono-ester of stearyl alcohol, and the like.

Suitable phosphate diesters of ethylene oxide adduct of alcohol or phenol of group 5) include phosphate diester of ethylene oxide adduct of dodecyl alcohol, phosphate diester of ethylene oxide adduct of octyl alcohol, phosphate diester of ethylene oxide adduct of stearyl alcohol, phosphate diester of ethylene oxide adduct of oleyl alcohol, phosphate diester of ethylene oxide adduct of nonylphenol, phosphate diester of ethylene oxide adduct of dodecyl-phenol and the like.

Suitable phosphite diesters of ethylene oxide adduct of alcohol or phenol of group 6) include phosphite diester of ethylene oxide adduct of dodecyl alcohol, phosphite diester of ethylene oxide adduct of stearyl alcohol, phosphite diester of ethylene oxide adduct of oleyl alcohol, phosphite diester of ethylene oxide adduct of nonylphenol, phosphate diester of ethylene oxide adduct of dodecyl-phenol and the like.

Suitable pentavalent organic phosphoric acid compounds of group 7) include dibutyl phosphate, dipentyl phosphate, dihexyl phosphate, diheptyl phosphate, dioctyl phosphate, bis(1-methylheptyl)phosphate, bis(2-ethylheptyl)phosphate, dilauryl phosphate, dioleyl phosphate, diphenyl phosphate, bis(p-nonylphenyl)phosphate, butyl(2-ethylhexyl) phosphate, (1-methylheptyl)(2-ethylhexyl)phosphate, (2-ethylhexyl)(p-nonylphenyl)phosphate, monobutyl(2-ethylhexyl)phosphonate, mono-2-ethylhexyl(2-ethylhexyl) phosphonate, mono-2-ethylhexyl phenyl phosphonate, mono-p-nonylphenyl(2-ethylhexyl)phosphonate, dibutylphosphinic acid, bis(2-ethylhexyl)phosphinic acid, bis(1-methylheptyl)phosphinic acid, dilauryl phosphinic acid, dioleyl phosphinic acid, diphenyl phosphinic acid, bis(p-nonylphenyl) phosphinic acid, butyl(2-ethylhexyl) phosphinic acid, (2-ethylhexyl)(1-methylheptyl) phosphinic acid, (2-ethylhexyl)(p-nonylphenyl)phosphinic acid, and the like.

Suitable trivalent phosphorous acids of group 8) include bis(2-ethylhexyl)phosphite, bis(1-methylheptyl)phosphite, bis(2-ethylhexyl)phosphinous acid, and the like.

Suitable organomagnesium compounds (b) have the general formula $MgR^{13}R^{14}$, where $R^{13}$ and $R^{14}$ independently are aliphatic hydrocarbon groups or aromatic hydrocarbon groups, such as alkyl, cycloalkyl, aryl, aralkyl, allyl, or cyclodiene groups, which may be the same or different. Examples include diethylmagnesium, di-n-propylmagnesium, di-isopropylmagnesium, di-n-butylmagnesium, n-butyl sec-butylmagnesium, di-sec-butylmagnesium, di-tert-butylmagnesium, di-n-hexylmagnesium, di-n-propylmagnesium, diphenylmagnesium, and the like, alone or in combination.

Preferably, component (b) is a dialkyl magnesium wherein each R is an alkyl group having 1 to 10 carbon atoms. Magnesium dibutyl is a particularly preferred component (b) because of its wide availability. Component (b) acts as a co-catalyst for initiating the reaction. The product of a polymerization employing catalyst system I or II which includes an organomagnesium component as co-catalyst is a conjugated diene polymer having a very high content of trans isomer.

Preferably, the molar ratio of the component (a) to the component (b) in catalyst system I or II is from about 0.01:1 to about 1:1, more preferably, 0.06:1 to 0.3:1. The absolute concentration of component (b) may be for example, 1 to 5 mmol per 100 g polymerizable monomer. Preferably, the monomer is added to the solvent, followed by component (a) and then component (b).

Suitable organic compounds of lithium (c) include organolithium or lithium salts of an organic acid, such as alkyl lithium compounds, lithium salts of alcohols, lithium salts of glycol ethers, lithium salts of alcohols, phenols, thioalcohols, and thiophenols, lithium salts of dialkylamineoethanol, lithium salts of secondary amines, lithium salts of cyclic imines, and the like. Preferred organic compounds of lithium include $C_2$–$C_{10}$ alkyl lithium compounds, such as methyl lithium, ethyl lithium, n-propyl lithium, n-butyl lithium, sec-butyl lithium, isoamyllithium, and the like, alone or in combination.

Suitable barium or strontium organic compounds (d) include barium or strontium salts of aliphatic or aromatic groups, such as alcohols, phenols, thioalcohols, thiophenols, carboxylic acids or sulfur analogs, glycol ethers, dialkylaminoalcohols, diarylaminoalcohols, secondary amines, cyclic imines, sulfonic acids, and sulfate esters, alone, or in combination.

Suitable barium or strontium salts of alcohols and phenols are those of the general formula $(R^{15}\text{—}O)_2Me$, where $R^{15}$ is an aliphatic or an aromatic hydrocarbon group. Examples include salts of ethyl alcohol, n-propyl alcohol, isopropyl alcohol, n-butyl alcohol, isobutyl alcohol, 2-butyl alcohol, tert-butyl alcohol, n-amyl alcohol, n-hexyl alcohol, n-heptyl alcohol, n-octyl alcohol, cyclohexyl alcohol, allyl alcohol, cyclopentyl alcohol, benzyl alcohol, phenol, 1-naphthol, 2,6-ditert-butylphenol, 2,4,6-tritert-butylphenol, nonylphenol, and 4-phenylphenol.

Suitable barium of strontium salts of thiols and thiophenols are of the general formula $(R^{16}\text{—}S)_2Me$, where $R^{16}$ is an aliphatic or an aromatic hydrocarbon group. Examples include salts of ethanethiol, 1-butanethiol, thiophenol, cyclohexanethiol, and 2-naphthalenethiol.

Suitable barium or strontium salts of carboxylic acids and sulfur analogs thereof are of the general formula $(R^{17}\text{—}C(O)O)_2Me$ and $(R^{18}\text{—}C(O)S)Me_{,2}$ where $R^{17}$ and $R^{18}$ independently are an aliphatic or an aromatic hydrocarbon group. Examples include salts of isovaleric acid, caprilic acid, lauric acid, myristic acid, palmitic acid, stearic acid, oleic acid, linoleic acid, cyclopentanecarboxylic acid, naphthalenic acid, ethylhexanoic acid, pivalic acid, Versatic™ acid, phenylacetic acid, benzoic acid, hexane thionic acid, 2,2-dimethylbutanethionic acid, decanethionic acid, tetradecanethionic acid, thiobenzoic acid, and the like.

Suitable barium or strontium salts of glycol ethers are of the general formula $[(R^{19}\text{—}O\text{—}(CH_2CH_2C\text{—}O)_n]_2Me$, where n is an integer less than 6 and $R^{19}$ is an aliphatic or an aromatic hydrocarbon group. Examples include salts of ethylene glycol monomethyl ether, ethylene glycol monoethyl ether, ethylene glycol monobutyl ether, ethylene glycol monopropyl ether, diethylene glycol monomethyl ether, diethylene glycol monoethyl ether, diethylene glycol monobutyl ether, triethylene glycol monobutyl ether, diethylene glycol monophenyl ether, and the like.

Suitable barium or strontium salts of dialiphatic or diaromatic amines are of the general formula $[R^{20}N(R^{21})\text{—}(CH_2CH_2\text{—}O)_n]_2Me$, where n is an integer less than 6 and $R^{20}$ and $R^{21}$ are aliphatic or aromatic hydrocarbon groups. Examples include salts of dimethylaminoethanol, diethylaminoethanol, di-n-propylaminoethanol, and the like.

Suitable barium or strontium salts of secondary amines are of the general formula $[R^{22}N(R^{23})]_2Me$, where $R^{22}$ and $R^{23}$ are aliphatic or aromatic hydrocarbon groups. Examples include salts of dimethylamine, diethylamine, di-n-propylamine, di-isopropylamine, di-n-butylamine, di-n-hexylamine, and the like.

Suitable barium or strontium salts of cyclic amines include salts of ethyleneimine, triethyleneimine, pyrrolidine, piperidine, hexamethylene imine, and the like.

Suitable barium or strontium salts of sulfonic acids are of the general formula $(R^{24}-OSO_3)_2Me$, where $R^{24}$ is an aliphatic or aromatic hydrocarbon group. Examples include salts of butanesulfonic acid, hexanesulfonic acid, decanesulfonic acid, tridecanesulfonic acid, dodecylbenzenesulfonic acid, tetradecylbenzenesulfonic acid, octadecylbenzenesulfonic acid, dibutylnaphthalene-sulfonic acid, di-isopropylnaphthalenesulfonic acid, n-hexylnaphthalenesulfonic acid, dibutylphenylsulfonic acid, and the like.

Suitable barium or strontium salts of sulfate esters have the general formula $(R^{25}-SO_3)_2Me$, where $R^{25}$ is an aliphatic or aromatic hydrocarbon group. Examples include sulfate esters of lauryl alcohol, oleyl alcohol, stearyl alcohol, and the like.

Suitable organoaluminum compounds are of the general formula $Al(R^{26})(R^{27})(R^{28})$, where $R^{26}$, $R^{27}$, and $R^{28}$ independently are selected from H, aliphatic hydrocarbon groups, or aromatic hydrocarbon groups, with the proviso that not all are H. Examples include triethyl aluminum, tri-isobutylaluminum, tri-n-propylaluminum, tri-n-hexylaluminum, diethyl aluminum monohydride, and the like.

Suitable organozinc compounds (e) are of the general formula $R^{29}-Zn-R^{30}$, where $R^{29}$ and $R^{30}$ may be the same or different and are selected from hydrogen, aliphatic hydrocarbon groups, or aromatic hydrocarbon groups, but not both hydrogen. Examples include diethyl zinc, di-n-propyl zinc, di-iso-amyl zinc, di-isobutyl zinc, and the like.

If desired, polymerization with catalyst system I or II may be carried out in the presence of a polar component such as a Lewis base, e.g., tetrahydrofuran. Examples of other polar compounds are (a) ethers, such as dimethyl ether, diethyl ether, diphenyl ether, dibenzyl ether, and anisole; (b) amines, such as trimethylamine, triethylamine, pyridine, and tetra methyl ethylene diamine; (c) thioethers, such as thiophene; and (d) polyethers, such as 1,2-dimethoxy ethane, glyme, and diglyme. These polar compounds enable higher conversions of monomer to polymer to be obtained with no effect on trans content, unless very high levels (greater than about 2.5:1 molar ratio polar compound:component (b)) are used. Addition of a polar compound produces no increase in vinyl content of the polymer, in contrast to the increase in vinyl content such compounds produce in anionic polymerizations.

In catalyst system II, low molar ratios of lithium alkyl to magnesium alkyl, e.g., below 0.5:1, result in enhanced yield with virtually no effect on microstructure. Using higher molar ratios than 0.5:1 (e.g., up to 1.5:1), the trans content of the polymer may be decreased from 96% to about 50% (decreasing as the proportion of lithium alkyl is increased).

The addition of component (e) to catalyst system IV tends to result in improvement of catalytic activity or an increase in the trans linkage content.

The organomagnesium content (b) of the catalyst systems III and IV is preferably from 0.1 to 50 mmol per 100 g of the total monomers, more preferably, from 0.5 to 5 mmol. Below 0.1 mmol, the polymerization activity may be unacceptably slow or the molecular weight too high for processing.

The organic compound of lithium (c) in the catalyst systems III and IV is preferably present in a Li:Mg molar ratio (moles of lithium:moles of magnesium) in the range of from 0.1 to 10, more preferably, from 0.5 to 2. Below a ratio of 0.1, the polymerization activity may be unacceptably slow. Above a ratio of 10, the trans content of the resulting polymer tends to decrease.

The organic compound of barium or strontium (d) in catalyst systems III and IV is preferably present in a $Me^1$:Mg molar ratio ($Me^1$ being strontium or barium) in the range of from 0.005:1 to 10:1, more preferably, from 0.1:1 to 1:1. Below a ratio of 0.005, the trans content of the resulting polymer tends to be low. Above a ratio of 10:1, the polymerization activity may be unacceptably slow.

The organoaluminum or organozinc compound (e), of catalyst system IV is preferably in a $Me^2$:Mg molar ratio ($Me^2$ being aluminum or zinc) of up to 50:1, more preferably, the ratio is 5:1, or less, most preferably, the ratio is 1:1, or less. Above a ratio of 50:1, the polymerization activity may be unacceptably slow.

For each of catalyst systems I–IV, the reaction is carried out in the presence of a solvent. Suitable solvents include alkanes, such as n-pentane, n-hexane, and n-heptane; cycloalkanes, such as cyclohexane; aromatic hydrocarbons, such as benzene, toluene; carboxylates; alkoxides; and diketones, or combinations of such solvents. Preferably, the catalyst components are soluble in the reaction medium used. Hexane, cyclohexane, and toluene are preferred solvents, alone or in combination with other solvents. The solvent may also contain partially polar organic compounds containing no active hydrogen, such as tertiary amines and ethers for the purpose of accelerating the polymerization reaction, improving the solubility of the catalyst, and the like.

A reaction temperature of, for example, 0° to 150° C. is convenient. More preferably, the reaction temperature is from 20° to 100° C. and an elevated pressure, e.g. up to 10 atm may be used, because of the vapor pressure of the monomer(s) under the reaction conditions. Generally, the molecular weight of the polymer is lower if a higher polymerization temperature is used and vice versa. Molecular weight also increases with polymerization time because the catalyst system is at least partially living. Batch or continuous processes may be used.

Other catalyst systems not described herein may also be used providing that the resulting polymer has end groups capable of coupling with a coupling agent.

The resulting polymer formed in the first polymerization step (e.g., polybutadiene) has a $M_w$ of from about 20,000 to about 80,000, more preferably 30,000–50,000, most preferably, around 40,000. If the molecular weight is above this range, e.g., about 150,000 or above, its use as a processing aid is less effective. The polymer also has end groups which are capable of being coupled with a coupling agent.

The polymer produced preferably has a trans linkage content in the diene (e.g. butadiene) moiety of more than 80%, as measured by IR spectrophotometry and calculated by the Morero method. If the trans-linkage is less than 80%, the low molecular weight polymer product is a high viscosity, tacky resin, which is difficult to handle. Above about 80%, the product is a plastic at room temperature, making it easy to handle in the form of pellets, a powder, or the like. On the other hand, if the trans-linkagle content is too high, the softening temperature of the polymeric resin material will become too high, whereby moldability and workability at relatively lower temperatures will undesirably be reduced.

The coupling step is carried out after the first polymerization step has approached or reached completion. There may be some amounts of monomer remaining in the polymerization mixture. One way of establishing that the polymerization is essentially complete is to study the reaction temperature. On reaction with the catalyst, the exothermic reaction generally results in an increase in the temperature. Once the temperature has reached a maximum and begun to drop, the reaction is essentially over and the coupling agent may be added at this stage.

Suitable coupling agents are halides of tin, such as $SnCl_4$, $SnBr_4$, and the like, alone or in combination. Other coupling agents which increase the molecular weight of the polymer and are capable of undergoing a subsequent decoupling reaction, as will be described herein, may also be used.

The coupling agent may be added directly to the mix. The coupling agent reacts with the reactive end groups of the polymer to form tin-polymer bonds in which up to 4 polymer molecules replace the chlorine atoms. The $M_w$ after coupling can be from about 80,000 to about 300,000, more preferably, up to about 200,000. Since the coupling agent terminates the polymer (i.e., stops further polymerization), it is not added until polymerization has proceeded to a level at which the polymer is of a suitable molecular weight for its intended purpose.

The coupling agent is reacted with the polymer for a period of time sufficient for coupling to occur. The reaction can take place at virtually any temperature, thus heating is not necessary. For example, at a temperature of around 80° C., the coupling reaction is essentially complete in about 30 minutes.

The coupling agent does not tend to react with the remaining monomer in the mix but with the reactive end groups of the living polymers.

Preferred ratios of $SnCl_4$, or other coupling agent, to polymer are readily determined by experimentation. The preferred amount is one which provides a maximum amount of coupling. Preferably the $SnCl_4$ is in a deficiency, i.e., the molar ratio of $4SnCl_4$:polymer is less than 1.

The coupled polymer thus formed has a sufficient molecular weight that it can be desolventized using a conventional desolventizing process which employs heat to remove the solvent. Rather than forming a tacky, resinous mass with little or no strength, the coupled polymer is of sufficient molecular weight that it exhibits relatively little tack and has sufficient elasticity and strength (similar to typical elastomers and plastics above their $T_g$ or $T_m$) to be readily processed on conventional desolventizing equipment. For example, the product may be removed from the desolventizing equipment as a film or other solid.

Suitable desolventizing processes include using a drum dryer (a hot 2-roll mill) or a steam desolventizing process. Other types of desolventizing processes are also contemplated, such as flash desolventizing processes or the use of an extruder drier. Desolventizing is readily carried out at a temperature above the boiling point of the solvent used, often for a short period of time, such as a matter of seconds. For example, for hexane or hexane blends, a temperature of from about 70° C. to about 160° C. is suitable, more preferably, from about 120–150° C. Preferably, the coupled polymer is heated as a thin film so that desolventizing occurs rapidly.

Temperatures and times typically used to desolventize the solution containing the coupled polymer and solvent and the time periods used are generally insufficient to result in significant decoupling of the polymer. Thus, a decoupling step is carried out after desolventizing to return the polymer essentially to the same form as existed prior to coupling, i.e., with a $M_w$ of below about 80,000, more preferably, about 25,000 to about 50,000, most preferably, about 40,000. The decoupling step is carried out by applying elevated temperatures to the coupled polymer. Temperatures in the range of 100° to 200° C. may be used, with a preferred temperature of from about 150° to 200° C. Above 200° C., problems may occur with unacceptable gelling and crosslinking of the polymer. At the lower end of the temperature range, the decoupling is relatively slow, for example, at 120° C. decoupling takes several hours to complete, whereas at higher temperatures decoupling is much faster. For example, at 180° C. the coupling is complete in one to two minutes. optionally, an accelerator can be added during the decoupling stage to increase the rate of decoupling. This may be particularly useful when low temperatures are used for decoupling. One suitable accelerator is 2,4-bis(tert-butyl) p-cresol, which may be added at a level of about 0.5% by weight of the polymer. Other suitable accelerators include HCl, and compounds which generate the same.

Stabilizers and antioxidants may be added to the resulting polymer, such as 2,6-di-tert-butyl-4-methylphenol, trinonylphenylphosphate, phenyl-β-naphthylamine, N,N'-dialkyldiphenylamine, N-alkyldiphenylamine, bis-tert-butyl hydryl toluene (BHT), and the like.

The decoupled polymer thus formed is suitable for a variety of uses. It has a $M_w$ essentially the same as the polymer prior to coupling, i.e., from about 20,000–80,000, more preferably, from about 22,000–50,000. One use is as a processing aid in the formation of rubber tread stock. The processing aid is a component of a rubber system which may include other additives, such as plasticizers, resins, and the like, in addition to natural or synthetic rubbers of high molecular weight (higher than that of the processing aid).

An exemplary process for carrying out the steps of the present invention is as follows. A reaction vessel is charged with solvent and a diene monomer or monomers, such as butadiene. This mixture is brought to a suitable starting temperature. Catalysts are added according to the preferred order for optimum polymerization. In the case of a lanthanum/organomagnesium catalyst, the lanthanum catalyst is added first, followed by the organomagnesium activator. The reaction mixture thus formed is allowed to exotherm, i.e., generate heat, during which time the monomer(s) is/are converted to polymer. When the reaction is essentially complete, coupling agent is added to the mix and the mixture stirred, preferably until coupling is complete. An antioxidant, such as BHT, can then be added. The polymerization mixture can then be desolventized to remove solvent from the coupled polymer. The desolventized polymer, or polymer cement, is heated to decouple the polymer.

The decoupling step can be carried out as part of another step in processing the polymer. For example, the heating (decoupling) stop may be carried out in a pelletizing machine. In pelletizing, the desolventized polymer is heated and then extruded and chopped into pellets. The heating step is generally sufficient to decouple the polymer. If necessary, the heating step in the pelletizer may be adjusted such that the temperature used is sufficient for decoupling to occur. Alternatively, decoupling may be carried out during formation of a rubber composition which incorporates the decoupled polymer as a processing aid, or the like. In this case, the desolventized coupled polymer, preferably in the form of a film, may be passed through a grinder which grinds the coupled polymer into a powder of a desired particle size. The grinder does not generate sufficient heat for decoupling the coupled polymer. Thus, the decoupling process can be carried out in a subsequent processing step. For example, decoupling can be carried out during mixing of the coupled desolventized polymer with other components of a rubber mixture during formation of a rubber compound. Other components of the mixture may include natural or synthetic rubbers of high molecular weight, plasticizers, resins, and the like. For example, the components are heated in a standard Banbury-type mixer.

Without intending to limit the invention, the following example shows how the coupling step increases the molecular weight of the polymer.

EXAMPLE

A 22 L reactor was charged with 6.08 kg of a 23.7 wt % butadiene/hexane blend. The blend was brought up to a temperature of about 40° C. Then, 10.5 mmol. lanthanum tris[bis(2-ethylhexyl)phosphate] was added to the blend. This was followed by 42 mmol. dibutyl magnesium. The polymerization was allowed to exotherm without external cooling or heating. A peak temperature of 71° C. was reached in 65 minutes. The polymerization was allowed to proceed for another 20 minutes, at which time 3.04 kg of the polymer cement was transferred out of the reactor and quenched with isopropanol. Approximately 8.9 mmol tin tetrachloride was added to the remainder of the polymer cement in the reactor. Conversion of monomer to polymer was found to be 93% at this time, based on the percent solids. 2,4,-bis(t-butyl)-p-cresol was added to both polymer cements to give a level of 0.5 wt % antioxidant/polymer. The base polymer (i.e., the removed polymer which was not coupled) was air dried and the coupled polymer was dried using a drum drier. Size exclusion chromatographs of the base polymer and the corresponding coupled polymer are shown in the FIGURE.

As can be seen from the FIGURE, the chromatographs of the uncoupled base polymer and the coupled polymer are distinctly different. The $M_w$ of the base polymer was about 27,000, while that of the coupled polymer was about 100,000.

The invention has been described with reference to the preferred embodiment. obviously, modifications and alterations will occur to others upon a reading and understanding of the specification. It is intended to include all such modifications and alterations in so far as they come within the scope of the appended claims or the equivalents thereof.

I claim:

1. A method for preparing a diene-containing polymer comprising:
   a) polymerizing a diene monomer, optionally in the presence of another conjugated monomer, in a suitable solvent in the presence of a catalyst to form a polymer of a first weight average molecular weight;
   b) reacting the polymer with a coupling agent to form a coupled polymer of a second weight average molecular weight which is higher than the first weight average molecular weight;
   c) desolventizing the coupled polymer; and
   d) decoupling the desolventized coupled polymer to form a decoupled diene-containing polymer having a lower weight average molecular weight than the coupled polymer.

2. The method of claim 1 wherein the catalyst is a catalyst system prepared from or derived from ingredients comprising:
   (1) a salt or a complex of a lanthanum metal and an organomagnesium compound;
   (2) a salt or a complex of a lanthanum metal, an organomagnesium compound, and an organic compound of lithium;
   (3) an organomagnesium compound, an organic compound of lithium, and an organic compound of barium or strontium;
   (4) an organomagnesium compound, an organic compound of lithium, an organic compound of barium or strontium, and an organoaluminum or organozinc compound; or
   (5) a salt or a complex of a lanthanum metal and an organolithium complex.

3. The method of claim 1 wherein the catalyst system is prepared from or derived from ingredients comprising:
   a salt or a complex of lanthanum, and
   an organomagnesium compound or a organolithium compound.

4. The method of claim 1 wherein the diene-containing polymer includes mer units derived from butadiene.

5. The method of claim 1 wherein the catalyst is one which generates a polymer with a reactive end group.

6. The method of claim 1 wherein the coupling agent comprises a tin halide.

7. The method of claim 6 wherein the tin halide is $SnCl_4$.

8. The method of claim 1 wherein the first molecular weight is from about 20,000 to about 80,000.

9. The method of claim 8 wherein the first molecular weight is from 25,000–50,000.

10. The method of claim 1 wherein the second molecular weight is from about 80,000 to about 300,000.

11. The method of claim 10 wherein the second molecular weight is from 80,000 to 200,000.

12. The method of claim 1 wherein the polymer of lower molecular weight than the coupled polymer has a molecular weight of from about 20,000 to about 80,000.

13. The method of claim 12 wherein the polymer of lower molecular weight than the coupled polymer has a molecular weight of from about 22,000 to about 50,000.

14. The method of claim 1 wherein the step of desolventizing includes desolventizing the coupled polymer using one of the group consisting of a drum drier and a steam desolventizing process.

15. The method of claim 1 wherein the step of decoupling the desolventized coupled polymer includes heating the desolventized coupled polymer at a sufficient temperature and for a sufficient time to substantially decouple the desolventized coupled polymer.

16. The method of claim 15 wherein the desolventized coupled polymer is heated to a temperature of from 100° to 200° C.

17. The method of claim 16 wherein the temperature is from about 150° to 200° C.

18. The method of claim 15 wherein said heating is performed in a pelletizing machine.

19. The method of claim 15 wherein the step of heating the desolventized coupled polymer is performed in the presence of a rubber composition which includes at least one of a natural rubber and a synthetic rubber.

20. The method of claim 1 further including incorporating the decoupled polymer into a rubber composition which includes at least one of a natural rubber and a synthetic rubber, the decoupled polymer acting as a cocurable processing aid for the rubber composition.

* * * * *